(12) United States Patent
Wu et al.

(10) Patent No.: US 11,341,998 B1
(45) Date of Patent: May 24, 2022

(54) HARDWARE-BASED READ SAMPLE AVERAGING

(71) Applicant: Seagate Technology LLC, Fremont, CA (US)

(72) Inventors: Zheng Wu, San Jose, CA (US); Marcus Marrow, San Jose, CA (US); Jason Bellorado, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/016,484

(22) Filed: Sep. 10, 2020

Related U.S. Application Data

(63) Continuation of application No. 16/104,929, filed on Aug. 19, 2018, now Pat. No. 10,803,902.

(51) Int. Cl.
*G06F 3/00* (2006.01)
*G11B 20/10* (2006.01)
*G06F 3/06* (2006.01)

(52) U.S. Cl.
CPC ...... *G11B 20/10009* (2013.01); *G06F 3/0604* (2013.01); *G06F 3/0619* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,461,644 A | 10/1995 | Bermans et al. | |
| 5,543,978 A | 8/1996 | Park | |
| 5,621,769 A | 4/1997 | Wan et al. | |
| 5,654,765 A | 8/1997 | Kim | |
| 5,862,192 A | 1/1999 | Huszar et al. | |
| 6,111,712 A | 8/2000 | Vishakhadatta et al. | |
| 6,181,213 B1 | 1/2001 | Chang | |
| 6,222,592 B1 | 4/2001 | Patel | |

(Continued)

OTHER PUBLICATIONS

T. Tsai, N. Theera-Ampornpunt and S. Bagchi, "A study of soft error consequences in hard disk drives," IEEE/IFIP International Conference on Dependable Systems and Networks (DSN 2012), 2012, pp. 1-8, doi: 10.1109/DSN.2012.6263936. (Year: 2012).*

(Continued)

*Primary Examiner* — Daniel F. McMahon
(74) *Attorney, Agent, or Firm* — Kirk A. Cesari; Christian W. Best

(57) ABSTRACT

Systems and methods are disclosed for hardware-based read sample averaging in a data storage device. In one example, a read channel circuit including a buffer memory is configured to receive a read instruction to read a selected sector, obtain detected sample values for the selected sector, and determine whether the read instruction corresponds to a re-read operation for the selected sector based on determining whether there are stored samples for the selected sector already stored to a locked buffer entry of the buffer memory. When there are stored sample values stored to the locked buffer entry, the example read channel circuit determines the re-read operation is occurring, and performs read sample averaging based on the detected sample values and the stored sample values to produce averaged sample values. Other examples and configurations are also described.

20 Claims, 9 Drawing Sheets

(56) References Cited

U.S. PATENT DOCUMENTS

| | | |
|---|---|---|
| 6,396,887 B1 | 5/2002 | Ware et al. |
| 6,438,185 B1 | 8/2002 | Huttunen |
| 6,505,222 B1 | 1/2003 | Davis et al. |
| 6,519,107 B1 | 2/2003 | Ehrlich et al. |
| 6,549,587 B1 | 4/2003 | Li |
| 6,580,676 B1 | 6/2003 | Yanagisawa et al. |
| 6,581,182 B1 | 6/2003 | Lee |
| 6,633,894 B1 | 10/2003 | Cole |
| 6,665,308 B1 | 12/2003 | Rakib et al. |
| 6,707,772 B1 | 3/2004 | Marrec et al. |
| 6,738,205 B1 | 5/2004 | Moran et al. |
| 7,085,330 B1 | 8/2006 | Shirali |
| 7,133,239 B1 | 11/2006 | Hartman et al. |
| 7,440,208 B1 | 10/2008 | Mcewen et al. |
| 7,929,238 B1 | 4/2011 | Vasquez |
| 7,948,703 B1 | 5/2011 | Yang |
| 8,027,117 B1 | 9/2011 | Sutardja et al. |
| 8,160,181 B1 | 4/2012 | Song et al. |
| 8,296,637 B1 | 10/2012 | Varnica et al. |
| 8,456,977 B2 | 6/2013 | Honma |
| 8,543,894 B1 | 9/2013 | Varnica et al. |
| 8,724,245 B1 | 5/2014 | Smith et al. |
| 8,755,139 B1 | 6/2014 | Zou et al. |
| 8,760,794 B1 | 6/2014 | Coker et al. |
| 8,767,341 B1 | 7/2014 | Coker et al. |
| 8,780,477 B1 | 7/2014 | Guo et al. |
| 8,887,033 B1 | 11/2014 | Varnica et al. |
| 9,019,642 B1 | 4/2015 | Xia et al. |
| 9,025,269 B1 | 5/2015 | Wong et al. |
| 9,093,115 B1 | 7/2015 | Fung et al. |
| 9,147,416 B2 | 9/2015 | Grundvig et al. |
| 9,189,315 B1 | 11/2015 | Varnica et al. |
| 9,202,514 B1 * | 12/2015 | Huang ............ G11B 20/10046 |
| 9,246,668 B1 | 1/2016 | Yu et al. |
| 9,257,145 B1 | 2/2016 | Soderbloom et al. |
| 9,286,915 B1 | 3/2016 | Dziak et al. |
| 9,311,959 B1 | 4/2016 | Fan et al. |
| 9,385,757 B1 | 7/2016 | Nangare |
| 9,489,976 B2 | 11/2016 | Jury et al. |
| 9,536,563 B1 | 1/2017 | Liu et al. |
| 9,542,972 B1 | 1/2017 | Nayak et al. |
| 9,645,763 B2 | 5/2017 | Sankaranarayanan et al. |
| 9,819,456 B1 | 11/2017 | Bellorado et al. |
| 9,928,854 B1 * | 3/2018 | Jury ...................... G11B 5/035 |
| 9,947,362 B1 | 4/2018 | Venkataramani et al. |
| 9,998,136 B1 | 6/2018 | Wu |
| 10,056,132 B1 * | 8/2018 | Lammers ............ G06F 13/4282 |
| 10,164,760 B1 | 12/2018 | Bellorado et al. |
| 10,177,771 B1 | 1/2019 | Bellorado et al. |
| 10,180,868 B2 | 1/2019 | Alhussien et al. |
| 10,276,233 B1 | 4/2019 | Danjean et al. |
| 10,297,281 B1 | 5/2019 | Bellorado et al. |
| 10,469,290 B1 | 11/2019 | Marrow et al. |
| 10,498,565 B1 | 12/2019 | Azenkot et al. |
| 10,719,392 B1 * | 7/2020 | Sridhara ............ G06F 11/1482 |
| 10,803,902 B1 * | 10/2020 | Wu ..................... G06F 3/068 |
| 2002/0080898 A1 | 6/2002 | Agazzi et al. |
| 2003/0185114 A1 | 10/2003 | Liaw |
| 2003/0198152 A1 | 10/2003 | Morishima |
| 2004/0101068 A1 | 5/2004 | Wang et al. |
| 2004/0228397 A1 | 11/2004 | Bach |
| 2005/0117243 A1 | 6/2005 | Serizawa |
| 2006/0215290 A1 | 9/2006 | Kurtas et al. |
| 2007/0139805 A1 | 6/2007 | Mead |
| 2007/0139806 A1 | 6/2007 | Southerland et al. |
| 2007/0177292 A1 | 8/2007 | Bui et al. |
| 2008/0007855 A1 | 1/2008 | Vityaev et al. |
| 2008/0158711 A1 | 7/2008 | Bliss et al. |
| 2008/0175309 A1 | 7/2008 | Fimoff et al. |
| 2009/0028252 A1 | 1/2009 | Lu |
| 2009/0097606 A1 | 4/2009 | Hutchins et al. |
| 2009/0141386 A1 | 6/2009 | Miura |
| 2009/0262870 A1 | 10/2009 | Ashbrook et al. |
| 2009/0323214 A1 | 12/2009 | Grundvig et al. |
| 2010/0172046 A1 * | 7/2010 | Liu ................. G11B 20/10055 360/39 |
| 2011/0002375 A1 | 1/2011 | Honma |
| 2011/0043938 A1 * | 2/2011 | Mathew ............ G11B 5/59688 360/31 |
| 2011/0072335 A1 | 3/2011 | Liu et al. |
| 2011/0080211 A1 * | 4/2011 | Yang ................. H03M 13/3746 327/551 |
| 2012/0082018 A1 | 4/2012 | Gushima et al. |
| 2012/0105994 A1 | 5/2012 | Bellorado et al. |
| 2013/0070362 A1 * | 3/2013 | Mathew ............... G11B 19/045 360/65 |
| 2013/0076433 A1 | 3/2013 | Fratti |
| 2013/0201838 A1 | 8/2013 | Homchaudhuri et al. |
| 2014/0009192 A1 | 1/2014 | Suzuki |
| 2014/0035638 A1 | 2/2014 | Bode |
| 2014/0223114 A1 | 8/2014 | Wang et al. |
| 2015/0003221 A1 | 1/2015 | Sankaranarayanan et al. |
| 2015/0279398 A1 | 10/2015 | Fan et al. |
| 2015/0355838 A1 | 12/2015 | Chen et al. |
| 2016/0112218 A1 | 4/2016 | Abe |
| 2016/0293205 A1 | 10/2016 | Jury et al. |
| 2016/0351227 A1 * | 12/2016 | Kishino ............. G11B 20/1879 |
| 2017/0125089 A1 | 5/2017 | Sankaranarayanan et al. |
| 2017/0125110 A1 | 5/2017 | Sankaranarayanan et al. |
| 2017/0236592 A1 | 8/2017 | Alhussien et al. |
| 2017/0249206 A1 | 8/2017 | Jeong et al. |
| 2018/0011753 A1 | 1/2018 | Alhussien et al. |
| 2018/0012663 A1 | 1/2018 | Alhussien et al. |
| 2018/0277158 A1 | 9/2018 | Kishino |
| 2018/0367164 A1 | 12/2018 | Marrow et al. |
| 2019/0130967 A1 | 5/2019 | Danjean et al. |
| 2020/0065262 A1 | 2/2020 | Bellorado |

OTHER PUBLICATIONS

S. C. Lin and J. M. Cioffi, "Packet detection for magnetic storage channels," GLOBECOM 97. IEEE Global Telecommunications Conference. Conference Record, 1997, pp. 1254-1257 vol. 3, doi: 10.1109/GLOCOM.1997.644336. (Year: 1997).*

Guo, Yuanbin , "An Efficient Circulant MIMO Equalizer for CDMA Downlink: Algorithm and VLSI Architecture", Hindawi Publishing Corporation, Jan. 1, 2006 00:00:00.0, pp. 1-18.

Hicks, James , "Overloaded Array Processing with Spatially Reduced Search Joint Detection", Virginia Polytechnic Institute & State University, May 10, 2000 00:00:00.0, pp. 1-144.

Mohammad, Maruf , "Blind Acquisition of Short Burst with Per-Survivor Processing (PSP)", Virginia Polytechnic Institute & State University, Nov. 26, 2002 00:00:00.0, pp. 1-127.

Nechaev, Y. B., et al., "Increasing Efficiency of Information Transmission with Interference Influence by the Use of Multi-Parameter Adaptation", East-West Design & Test Symposium (EWDTS 2013), Rostov-on-Don, 2013, pp. 1-4 (Year: 2013).

Sun, D. , et al., "A 1 GHz CMOS analog front-end for a generalized PRML read channel", IEEE Journal of Solid-State Circuits, vol. 40, No. 11, pp. 2275-2285, Nov. 2005.

* cited by examiner

HARDWARE-BASED READ SAMPLE AVERAGING

CROSS-REFERENCE TO RELATED APPLICATIONS

The present application is a continuation of and claims priority to U.S. application Ser. No. 16/104,929, filed Aug. 19, 2018, entitled "Hardware-Based Read Sample Averaging", the contents of which are hereby incorporated by reference in their entirety.

SUMMARY

In certain embodiments, an apparatus may comprise a read channel circuit including a buffer memory, the read channel circuit configured to receive, at the read channel circuit from a controller, a read instruction to read a selected sector, obtain detected sample values for the selected sector, and determine whether the read instruction corresponds to a re-read operation for the selected sector based on determining whether there are stored samples for the selected sector already stored to a locked buffer entry of the buffer memory. When there are stored sample values stored to the locked buffer entry, the read channel circuit may determine the re-read operation is occurring, and perform read sample averaging based on the detected sample values and the stored sample values to produce averaged sample values, store the averaged sample values as the stored sample values, perform a decoding operation on the stored sample values to generate decoded data, and return the decoded data to the controller.

In certain embodiments, an apparatus may comprise a read channel including a buffer memory, the read channel configured to store sample data corresponding to a selected sector of a data storage medium to a buffer entry of the buffer memory, perform a decoding operation on the sample data, and lock the buffer entry when the selected sector fails to decode in order to retain the sample data in a locked buffer entry. The read channel may receive a read instruction to read the selected sector, and determine whether sample data for the selected sector is stored in the locked buffer entry. When sample data for the selected sector is stored in the locked buffer entry, the read channel may perform sample averaging utilizing the sample data stored in the locked buffer entry and new sample data from a current read to generate averaged sample data, and decode the selected sector using the averaged sample data.

In certain embodiments, a method may comprise receiving, at a read channel circuit from a storage controller, a read instruction to read a selected sector of a data storage medium, obtaining detected sample values for the selected sector, and determining whether the read instruction corresponds to a re-read operation for the selected sector based on determining whether there are stored samples for the selected sector already stored to a locked buffer entry of a buffer memory of the read channel circuit. When there are not stored sample values stored to the locked buffer entry, the method may include determining the read instruction does not correspond to the read-read operation, and storing the detected sample values to the buffer memory as the stored sample values. When there are stored sample values stored to the locked buffer entry, the method may include determining the re-read operation is occurring, performing read sample averaging based on the detected sample values and the stored sample values to produce averaged sample values, and storing the averaged sample values as the stored sample values. The method may include performing a decoding operation on the stored sample values to generate decoded data, and returning the decoded data to the controller.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
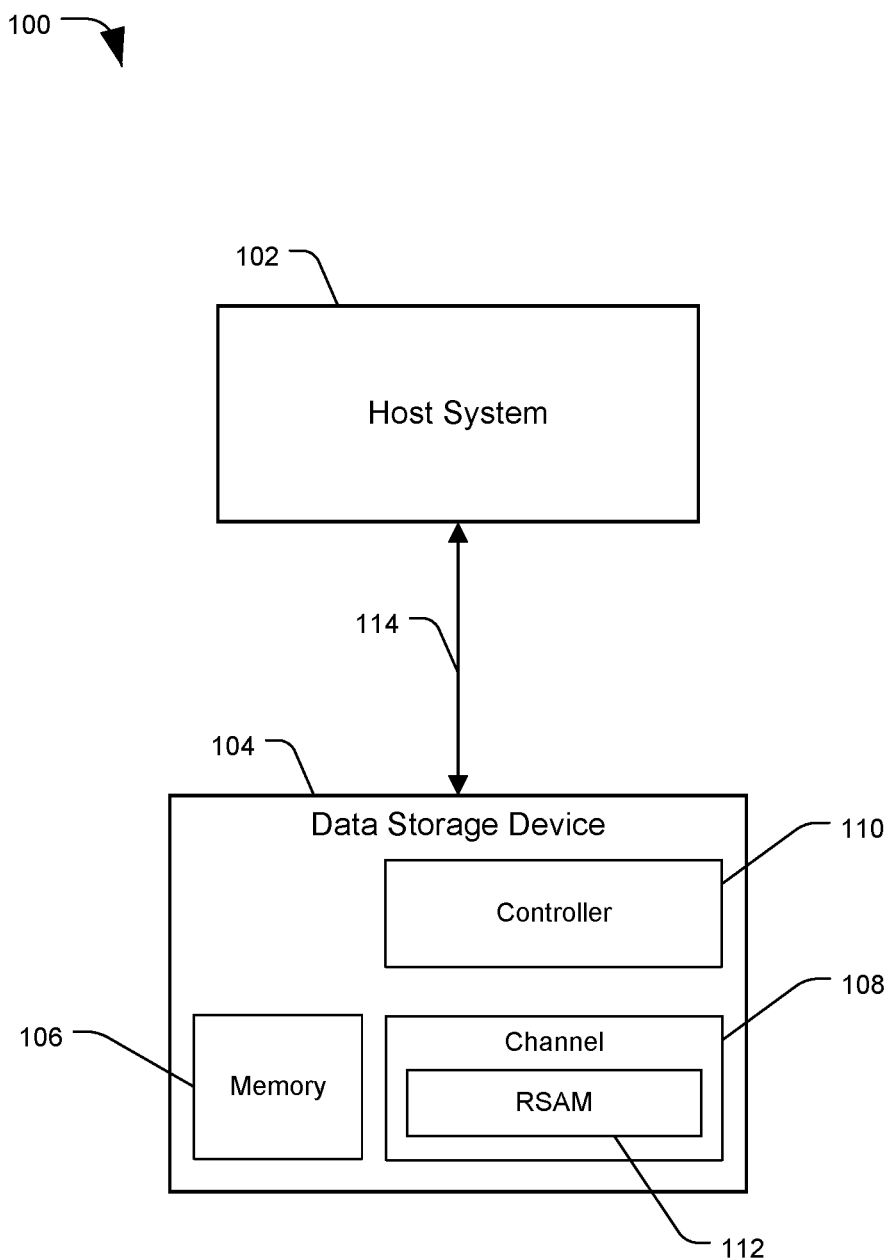
FIG. 1 is a diagram of a system configured to perform hardware-based read sample averaging, in accordance with certain embodiments of the present disclosure.

FIG. 1 is a diagram of a system, generally designated 100, configured to perform hardware-based read sample averaging, in accordance with certain embodiments of the present disclosure. The system 100 may include a host 102 and a data storage device (DSD) 104.

The host device 102 may also be referred to as the host system, host computer, or simply 'host'. The host 102 can be any computer or system that sends commands to the DSD 104. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing).

The host 102 may issue data access requests, such as read or write requests, to the DSD 104. In response, the DSD 104 may perform data access operations on the memory 106 via the controller 110 and the read channel 108 based on the requests. The DSD 104 may also access the memory 106 independently of host 102 commands, such as for storage or retrieval of system data and other metadata used by the DSD 104.

The DSD 104 may be a storage drive or any other device which may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives.

The DSD 104 may include a memory 106, a controller 110, and a channel circuit 108. The memory 106 may comprise one or more non-volatile memory (NVM) data storage mediums, such as magnetic hard disc platters, solid state memory, other types of memory, or any combination thereof. For the sake of explanation, examples provided herein will generally be directed to disc data storage mediums, although the teachings of this disclosure are not limited thereto.

The controller 110 may be one or more processors or circuits configured to perform data access operations, such as reads or writes (also called program operations), to the memory 106. The controller 110 may be referred to as a data storage controller, or as the main central processing unit (CPU) or processor of the DSD 104. The controller 110 may execute firmware (FW) that controls operations of the DSD 104. Data retrieved from the memory 106, or to be stored to the memory 106, may be processed via the controller 110, the channel 108 (e.g. a read/write (R/W) channel), or other elements for encoding or decoding data, error correction, or other processing.

The channel 108 may include one or more integrated circuits configured for processing signals read from the memory 106 or to be recorded to the memory 106 according to read or write (R/W) commands from the controller 110. The channel 108 may include circuitry, registers, and modules configured to perform operations in relation to a signal, and may be included on one or more chips of a device. In some embodiments one or more components of the DSD 104, such as the controller 110 and channel 108, may be included on a system on a chip (SoC). An SoC may be an integrated circuit that integrates all or multiple components of a computer or electronics system on a single substrate.

A channel 108 may be employed at a receiving end of wired or wireless transmissions, or in devices such as hard drives for storing data to and retrieving data from a storage medium. In some storage devices, such as hard disc drives, the channel 108 may include distinct channels or pathways for certain types of operations (although the different channel may share one or more components). For example, the channel 108 may include a write channel for processing digital sequences of bits into an analog signal to record to the memory 106, a read channel for retrieving and processing user data recorded to the memory 106, and a servo channel for reading and processing servo data recorded to servo sectors on a disc memory 106, which servo data can be used to obtain positioning information used for locating and adjusting a position of transducer heads relative to a surface of a disc platter.

As described herein, the host 102 can interact with the DSD 104 for the storage and retrieval of data. As shown, the host 102 can communicate directly with controller 110 by sending requests (and data, in the case of requests to store) across a host bus 114 to a host interface located in the controller 110. The controller 110 may respond to the host request by signaling to the channel 108 to carry-out the requested operation (and adjusting a position of read/write heads relative to a disc in the case of disc memory devices). In the case of data read operations, a signal may be received at the channel 108 (e.g. as detected by a read head) from the memory 106 and processed via the channel 108 to detect a bit sequence from the signal and to decode a data pattern from the bit sequence. Data may be stored to the memory 106 as data sectors (or just "sectors") of a given size. A disc data storage medium may have data recorded to a plurality of concentric circular tracks on a surface of the disc, with multiple sectors of data recorded to each track. Sectors may be read from the disc as a read head follows a track as the disc spins. The read head may read information from the disc by sensing a magnetic field of the disc, which the head may provide to the channel 108 as an analog signal. The channel may sample the analog signal, and determine a sequence of bits based on the samples. If the sequence of bits corresponding to a sector can be successfully decoded via a decoding algorithm, then the sector has been read successfully. If the bits for a sector cannot be decoded, then the read of that sector may have failed, and sector recovery, read recovery, or data recovery operations may be applied to attempt to recover the data from the failed sector.

The sector recovery procedures utilized in hard-disc drives when the initial read of a sector is not able to successfully produce the underlying data sequence can be extensive and, generally, consists of many steps. One such operation may be referred to as read sample averaging. In read sample averaging, the individual samples that comprise each of multiple reads of the same sector are averaged, which can effectively attenuate any component of the readback noise that is not repeatable from read-to-read. In doing so, the signal-to-noise ratio (SNR) of the resulting samples can be increased, thus improving the probability that the decoding operation conducted on these samples will succeed.

During read sample averaging, the samples from multiple reads of a given, failed, sector may be summed, divided by the number of reads, and applied to a decoding operation. Although such an operation may be conducted by firmware (e.g. via a microprocessor of the controller 110 or other component executing computer code to perform the read sample averaging), it may be particularly amenable to a hardware implementation (e.g. via an application-specific integrated circuit (ASIC)) and, thus, at least some portion of it may be offloaded to hardware.

Although single sector recovery by means of read sample averaging may be more straightforward, multi-sector recovery can quickly become complex. In multi-sector recovery, a read command spans a multitude of sectors and more than one sector fails to be successfully recovered. In some embodiments, the firmware would address each of the failed sectors in a serial manner, in which the next failed sector would be addressed only after the previous failed sector is successfully recovered. Clearly, in any system in which recovery time is an important figure-of-merit (it almost always is) such an approach may not be not desirable. Conversely, all of the sectors, or a subset thereof, may be recovered simultaneously. Although simultaneously recovering multiple sectors can obviate the lengthy recovery time incurred by single sector recovery, it can also have its difficulties. Firmware implementation of such a methodology may be complicated, particularly as the number of sectors being recovered changes as the recovery operation succeeds for a subset of the sectors. Managing the multitude of reads for each of a multitude of sectors can become difficult, and the required storage can quickly exceed the available internal memory (e.g. very fast working memory on a channel 108 chip, such as SRAM). Although additional storage (e.g. slower memory such as DRAM) may be used, it, too, may not be ideal, as shuffling samples to off-chip memory may be limited by the availability of memory bandwidth.

Accordingly, a novel methodology is proposed that may be used to fully hardware automate the operation of multi-sector recovery using read sample averaging. A read sample averaging module (RSAM) 112 may be provided within the channel 108 (or a particular channel such as the read channel). The RSAM 112 may be a hardware-based module (e.g. a specifically configured set of circuits and memory) configured to perform the operations described herein for read sample averaging, which can be used for recovery of multiple sectors simultaneously. The RSAM 112 may be configured to perform the read sample averaging, in which the only required intervention by firmware may be the dispatching of read commands, and all utilized memory is assumed internal to the channel 108 chip, thus obviating the aforementioned difficulties associated with single sector recovery or firmware-based multi-sector recovery. An example embodiment of system 100, including a more detailed diagram of DSD 104, is depicted in FIG. 2.

Figure 2:
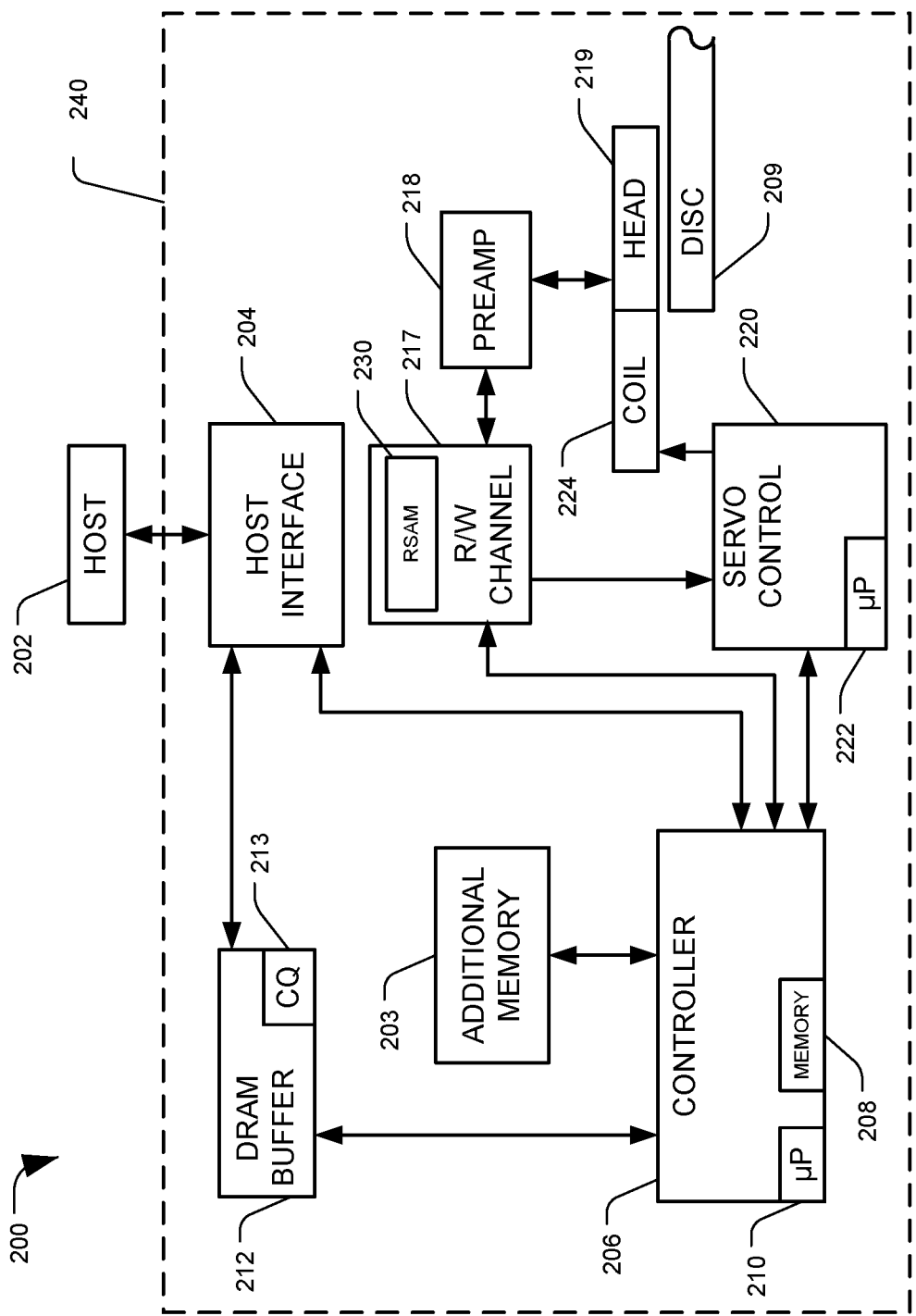
FIG. 2 is a diagram of a system configured to perform hardware-based read sample averaging, in accordance with certain embodiments of the present disclosure.

FIG. 2 is a diagram of a system, generally designated 200, configured to perform hardware-based read sample averaging, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as hard disc drive (HDD) 200, according to some embodiments. The one or more of the circuit components of the DSD 104 may be included on a single integrated circuit (e.g. a system on a chip, SoC), may be distributed among several circuit or hardware components, may be implemented as firmware modules executed by microprocessors, or in other configurations.

The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector that allows the DSD 200 to be physically removed from the host 202. The DSD 200 may have a casing 240 housing the components of the DSD 200.

Commands received from the host 202 via the interface 204 may be stored into a buffer 212. The buffer 212 can be DRAM, SRAM, or other types of memory. The buffer 212 can temporarily store data during read and write operations, and can include a command queue (CQ) 213 where multiple pending host commands can be temporarily stored pending execution. Commands arriving over the interface 204 may automatically be received in the CQ 213 or may be stored there by controller 206, interface 204, or another component.

The DSD 200 can include a programmable controller 206, which can include associated memory 208, and processor 210. The controller 206 may control data access operations, such as reads and writes, to one or more disc memories 209. The DSD 200 may include an additional memory 203 instead of or in addition to disc memory 209. For example, additional memory 203 can be a solid state memory, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

The DSD 200 can include the R/W channel 217, which can encode data during write operations and reconstruct data retrieved from a memory, such as disc(s) 209, during read operations. A preamplifier circuit (preamp) 218 can apply write currents to the head(s) 219 and provides pre-amplification of read-back signals. In some embodiments, the preamp 218 and head(s) 219 may be considered part of the R/W channel 217. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. The DSD 200 may have distinct channels for processing data sectors and servo sectors (e.g. a data channel and a servo channel), although in some embodiments a single channel may be used for both types of signal processing, or certain components may be shared by both channels.

DSD 200 may include a read sample averaging module (RSAM) 230. The RSAM 230 may perform the methods and processes described herein to perform hardware-based read sample averaging operations. The RSAM 230 may include one or more integrated circuits, such as application-specific integrated circuits (ASICs), field programmable gate arrays (FPGAs), and memory chips, and may include transistors and data storage buffers configured to perform the described read sample averaging functions. In some embodiments, the RSAM 230 may be part of or executed by R/W channel 217, although in some embodiments certain components or functionality of the RSAM 230 may be located elsewhere in the DSD 200 external to the channel 217. Additional details on an example read channel configured for hardware-based read sample averaging are discussed in regard to FIG. 3.

Figure 3:
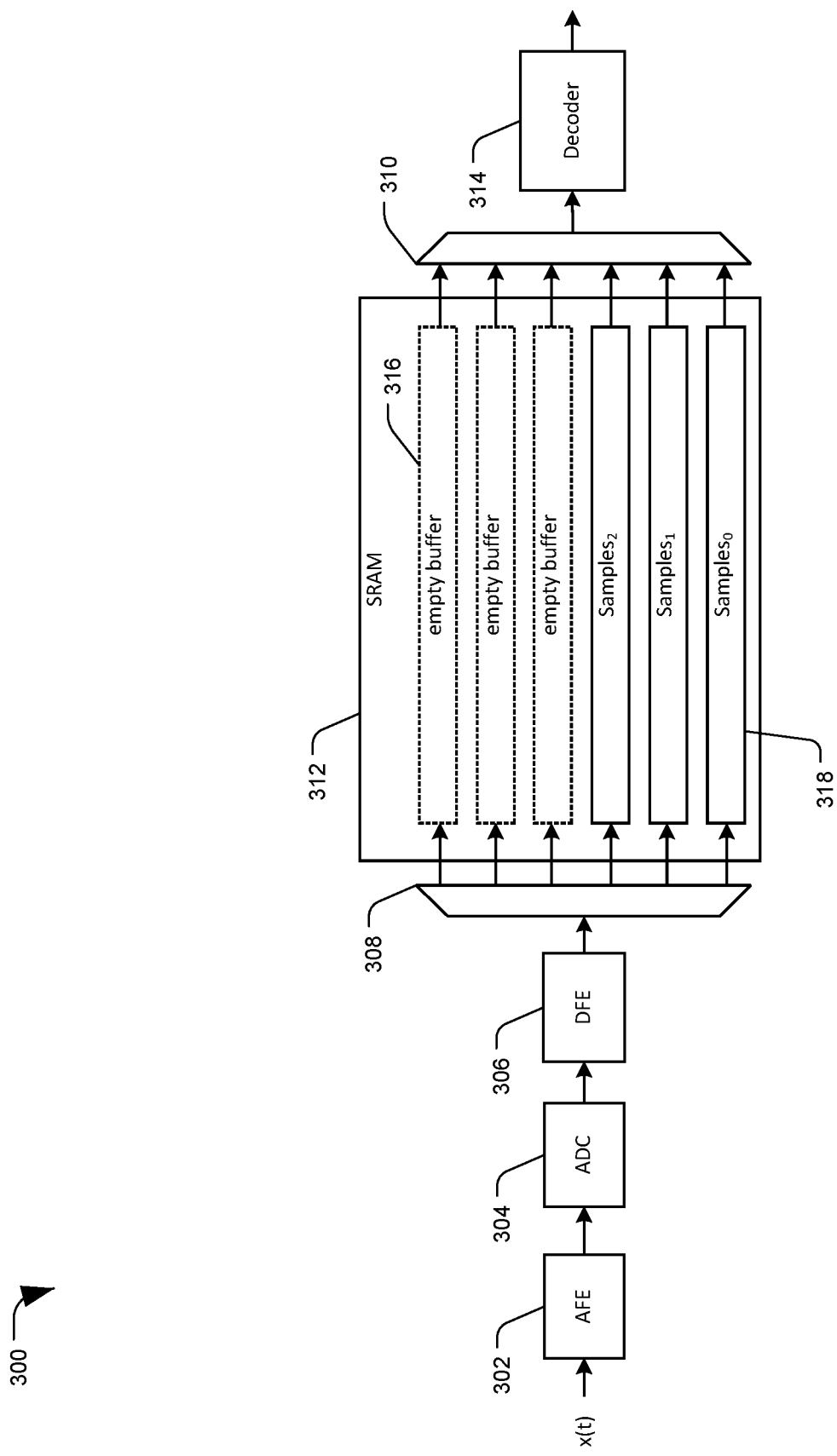
FIG. 3 is a diagram of a system configured to perform hardware-based read sample averaging, in accordance with certain embodiments of the present disclosure.

FIG. 3 is a diagram of a system configured to perform hardware-based read sample averaging, in accordance with certain embodiments of the present disclosure. In particular, FIG. 3 depicts an example channel 300 utilized to process sectors read from a hard-disk drive, which may correspond to the channel 108 of FIG. 1. The read channel 300 may include a plurality of components configured to convert and process analog signals into digital data. For example, the channel 300 may include an analog front end (AFE) 302, an analog to digital converter (ADC) 304, a digital front end (DFE) 306, multiplexers 308 and 310, an SRAM memory 312, and a decoder 314.

As shown, an analog read-back signal (x(t)) may be detected by a read element and provided to the AFE 302, which may condition the signal for sampling. The conditioned signal may be provided to the ADC 304, which may sample the signal at intervals controlled by a clock signal. Sampling the signal at the ADC 304 may include converting a continuous physical quantity (e.g. voltage) of the signal into discreet digital numbers or values representing the quantity's amplitude. The sampled values may be used to determine patterns in the signal which may be used to extract digital bits of information from the signal. The digital values from the ADC 304 may be provided to the DFE 306 for further processing and conditioning. The resulting samples 318 may then be routed via a first multiplexer 308 into one of a finite number of SRAM buffers 316. Each buffer entry 316 may store the samples 318 corresponding to a single sector of data. The samples 318 may be applied to the decoder 314 via a second multiplexer 310. The decoder 314 may perform operations to detect a bit value based on the sample values 318 and to apply a decoding algorithm to determine the original encoded data pattern and whether the data was read successfully. Results (e.g. the decoded data or an indication that a sector failed to decode) may be output from the decoder 314 to, for example, a controller. If a sector failed to decode, a command may be issued to reread the failed sector, and read sample averaging may be attempted.

Samples 318 may be stored to the SRAM 312 during reads due to the variable latency nature of the decoding operation at the decoder 314. Since the time it takes to decode a sector may be proportional to how difficult the samples 318 for the sector are to decode, the SRAM 312 provides a repository to hold samples 318 while other sectors occupy the decoding hardware 314. Once a sector is able to decode successfully its samples can be flushed from the SRAM buffer 316 it occupies to allow for occupation by a newly read sector. Additional details of the example channel 300 configured for hardware-based read sample averaging is described in regard to FIG. 4.

Figure 4:
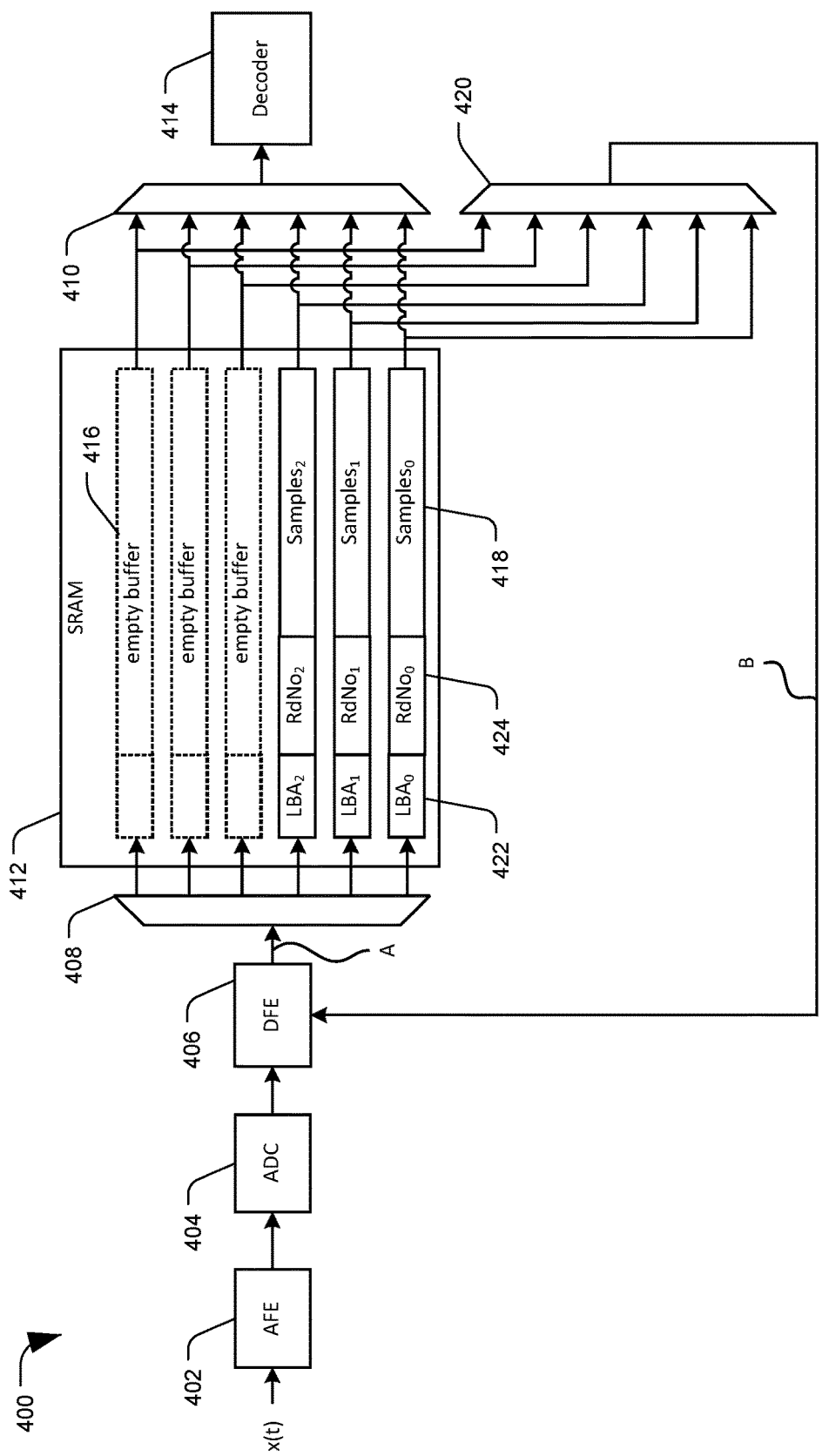
FIG. 4 is a diagram of a system configured to perform hardware-based read sample averaging, in accordance with certain embodiments of the present disclosure.

FIG. 4 is a diagram of a system configured to perform hardware-based read sample averaging, in accordance with certain embodiments of the present disclosure. In particular, FIG. 4 depicts an example channel 400 which may correspond to the channel 300 of FIG. 3. The read channel 400 may include an analog front end (AFE) 402, an analog to digital converter (ADC) 404, a digital front end (DFE) 406, multiplexers 408 and 410, an SRAM memory 412 having buffer entries 416, and a decoder 414, which components may correspond to the components as described in FIG. 3.

As shown, in addition to the stored samples 418, the channel 400 may also store both the logical block address (LBA) 422 and the read number (RdNo) 424 (e.g. starting at zero for the first read of a given sector) for each sector currently stored in the SRAM buffer 412. Note that although the LBA 422 and RdNo 424 values are shown as being stored in the SRAM 412, this embodiment is merely exemplary. In some embodiments, hardware may maintain a list of LBAs and read numbers in registers or other memories rather than keeping these values in SRAM 412. Registers may be small storage memories within the channel 400 or elsewhere on a SoC, and separate from the SRAM 412. The list of sectors residing in memory may be used to determine if the current read operation is for a new sector (in which the sector does not already reside in memory) or a re-read of a failed sector (in which the sector already resides in memory). For example, a digital logic module (e.g. in the DFE 406) may compare the LBA associated with a new set of samples against the LBAs 422 of samples already stored in the SRAM 412.

Read sample averaging operations may be triggered in hardware when an incoming LBA corresponds to an LBA that already is stored in the SRAM 412, indicating the sector failed to decode on at least one prior attempt. To ensure that sectors that failed to decode remain in the SRAM 412 upon unsuccessful decoding of a sector, the memory location 416 holding its samples can be locked, so that new reads will not be allowed to overwrite the stored sector. A multitude of failed sectors may be allowed to reside in SRAM memory 412. However, in some embodiments it may be advantageous to limit the total number of locked memory locations 416 to a specified value, to allow for newly read sectors to continue decoding during a recovery operation. For example, up to twenty percent of the buffer spaces 416 in SRAM 412 may be locked at a time, which may reserve the other eighty percent for newly read sectors in ongoing read operations.

When samples for a new sector are received, the LBA for the new sector may be compared against the LBAs 422 of sectors stored in the SRAM 412. If there is no match, the samples may be for a new sector read and stored to an empty buffer entry 416 along path A, and then provided to the decoder 414. If there is a match, the samples 418 for the matching sector may be retrieved from the SRAM 412 and sent, via a third multiplexer 420 along path B, to the DFE 406. In the DFE 406, the previously saved samples may be averaged with the newly read samples, potentially based on the number of reads 424 that have been performed on the sector in question. The read count 424 may be incremented, and the averaged samples may be stored to a new SRAM buffer space 416, or the buffer entry 416 storing the previous set of samples 418 for the sector may be overwritten in place. The averaged samples may then be provided, via the second multiplexer 410, to the decoder 414. If the averaged samples decode successfully, the buffer entry 416 occupied by the averaged samples may be, according to the implementation, unlocked and then flushed or overwritten with new data. If the sector still failed to decode, the buffer entry 416 with the averaged samples may be or remain locked. An example embodiment of the proposed DFE 406 is depicted in greater detail in FIG. 5.

Figure 5:
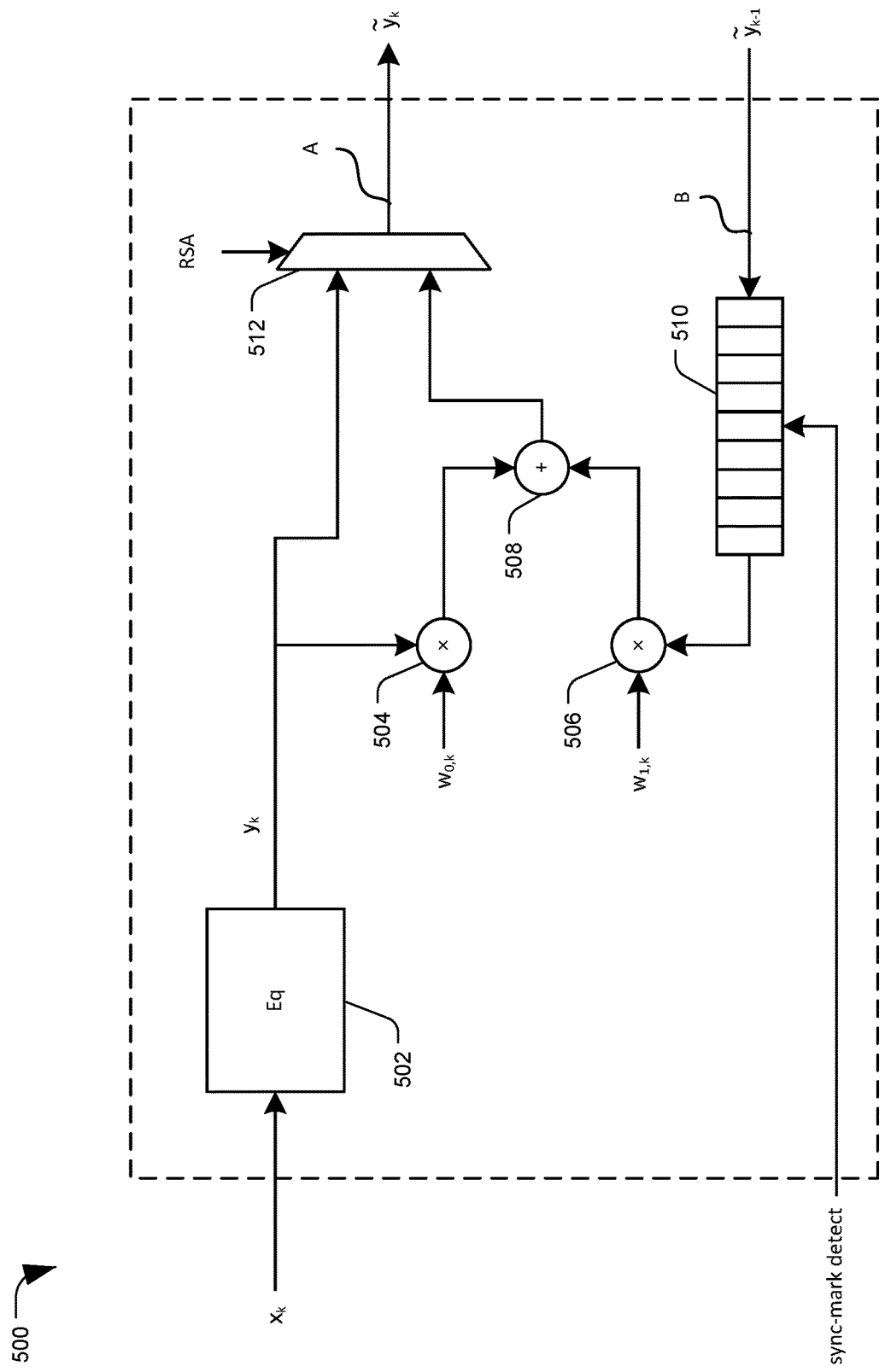
FIG. 5 is a diagram of a system configured to perform hardware-based read sample averaging, in accordance with certain embodiments of the present disclosure.

FIG. 5 is a diagram of a system configured to perform hardware-based read sample averaging, in accordance with certain embodiments of the present disclosure. In particular, FIG. 5 depicts an example digital front end (DFE) 500 of a read channel, which may correspond to the channel 300 of FIG. 3. In some embodiments, the DFE 500 may be referred to as a read sample averaging module (RSAM), or some or all of the processes described for the DFE 500 may be performed by a separate RSAM circuit.

The DFE 500 may include an equalizer (EQ) 502, a first multiplier node or weighting node 504, a second multiplier node or weighting node 506, a summation node 508, a delay line 510, and a multiplexer 512. The EQ 502 may perform conditioning operations on a sample sequence $x_k$ for a selected sector, for example received from an ADC, to produce an equalized sample sequence $y_k$. The "k" may refer to the current read attempt, for example starting at 0 and counting up by 1 for each additional re-read attempt. The multiplier nodes 504 and 506 may apply weighting multiplier values to sample values, for example so that the total multiplier for a set of two sample sets equals 1. For example, a 0.3 multiplier may be applied to the sample set $y_k$ by the first multiplier node 504, and a 0.7 multiplier may be applied to a previous sample set $\tilde{y}_{k-1}$ by the second multiplier node 506. The summation node 508 may add together the outputs from the first multiplier node 504 and the second multiplier node 506. The delay line 510 may be a circular buffer or other delay line element configured to temporarily store and delay a previous sample sequence $\tilde{y}_{k-1}$ so that it can be aligned with the corresponding samples $y_k$ from a current read, for example based on the detection of a sync mark at the beginning of the sector during the current read. The multiplexer 512 may control an output $\tilde{y}_k$ of the DFE 500, by switching between outputting only the current sample sequence $y_k$, or an average of the current sample sequence and a previous sample sequence, based on a read sample averaging (RSA) setting of the channel applied to the multiplexer 512. The RSA may be a signal generated by the hardware having a value (e.g. 0 or 1) based on a result of the LBA matching operation (e.g. comparing the incoming LBA against LBAs existing in the SRAM), or may be a bit or flag value stored to a register. The RSA may change depending on whether the current read is a first read of a sector or a re-read, and accordingly modify the output of the DFE 500.

During normal reads (e.g. the first read of a given sector rather than a re-read) the top path into the multiplexer 512 (e.g. corresponding to the current sample sequence $y_k$; in this example, $y_0$) may be selected by the hardware setting the RSA value to 0. An RSA of 0 may control the multiplexer 512 to pass the equalized samples $y_0$ directly to the memory (e.g. the SRAM buffer 412 of FIG. 4) for subsequent decoding. In this example, therefore, the DFE 500 output $\tilde{y}_k = y_0$. Note that passing the output of the EQ 502 here is merely exemplary, and that passing unequalized samples ($x_k$) is also a possibility, with the EQ 502 removed from the sample path within the DFE 500.

When a re-read is conducted for a sector currently residing in memory, the hardware may recognize this from its maintained list (e.g. by comparing an LBA of the incoming sector against a list of LBAs stored to the SRAM buffer). During a re-read, the hardware feeds back the associated stored samples $\tilde{y}_{k-1}$ to the DFE 500 along the path marked as B in FIGS. 4 and 5, and asserting RSA=1. In doing so, the bottom path into the multiplexer 512 can be selected, the samples of which may be generated as a linear combination of the newest read $\tilde{y}_k$ and samples being fed back from memory $\tilde{y}_{k-1}$. As noted above, the samples being fed back from memory $\tilde{y}_{k-1}$ may first be entered into the delay line 510 to which the result of sync-mark detection (from the newly read sector) may be applied. Because the result of sync-mark detection is a known alignment of the incoming samples $y_k$, this can allow for the incoming samples along the two paths to be correctly aligned (e.g. samples associated with the same written bit period can be added at the summing junction 508). The output $\tilde{y}_k$ of the multiplexer 512 may either be written directly back into the same buffer occupied by $\tilde{y}_{k-1}$ or, for the sake of implementation simplicity, written into another buffer such that the $\tilde{y}_{k-1}$ occupied buffer may be unlocked after the read is completed. In the former case only a single buffer may be used for each sector being recovered, whereas a second buffer may only temporarily be occupied for the latter implementation.

As noted above, the subscript k may be used to denote the re-read number associated with a given sector, where 0 denotes the first read and 1 denotes the first re-read. In some embodiments of this methodology, on the Nth re-read of a sector, an average of the (N+1) reads can be generated, for example using the following equation:

$$\tilde{y}_N = \frac{1}{(N+1)} \sum_{k=0}^{N} y_k. \qquad (1)$$

This averaging may be accomplished by selecting the weights applied at the first weighting node 504 and the second weighting node 506 based on the current re-read number k as, $$w_{0,k} = \frac{1}{(k+1)}, \quad w_{1,k} = \frac{k}{(k+1)}, k = 1, 2, \ldots \qquad (2)$$

For the approach of equation (2), on a first re-read (k=1), the newly read data $y_k$ would be given a weight of ½, while the data from the first read would also be given a weight of ½. However, each read retains equal weight, so that on each subsequent re-read attempt, the weight of the current read samples would be reduced (⅓, ¼, etc.) while the weight of the previous averaged samples would be increased (⅔, ¾, etc.).

In other embodiments it may be advantageous to select the weights statically as, $$w_{0,k} = \frac{1}{2}, \quad w_{1,k} = \frac{1}{2}. \qquad (3)$$

Such an approach may be equivalent to equation (2) for the first re-read; however, it adds a decaying exponential weighting thereafter, as shown below, $$\tilde{y}_N = \frac{y_0}{2^N} + \sum_{k=1}^{N} \frac{y_k}{2^{(N-k+1)}}. \qquad (4)$$

As shown in equation (4), this weights the most recent reads more heavily than in equation (3), which may be useful if a particular read is significantly corrupted and, thus, its weight can be continually reduced by this selection as new reads are conducted. Another example embodiment of a read sample averaging module or DFE configured to perform hardware-based read sample averaging is shown in FIG. 6.

Figure 6:
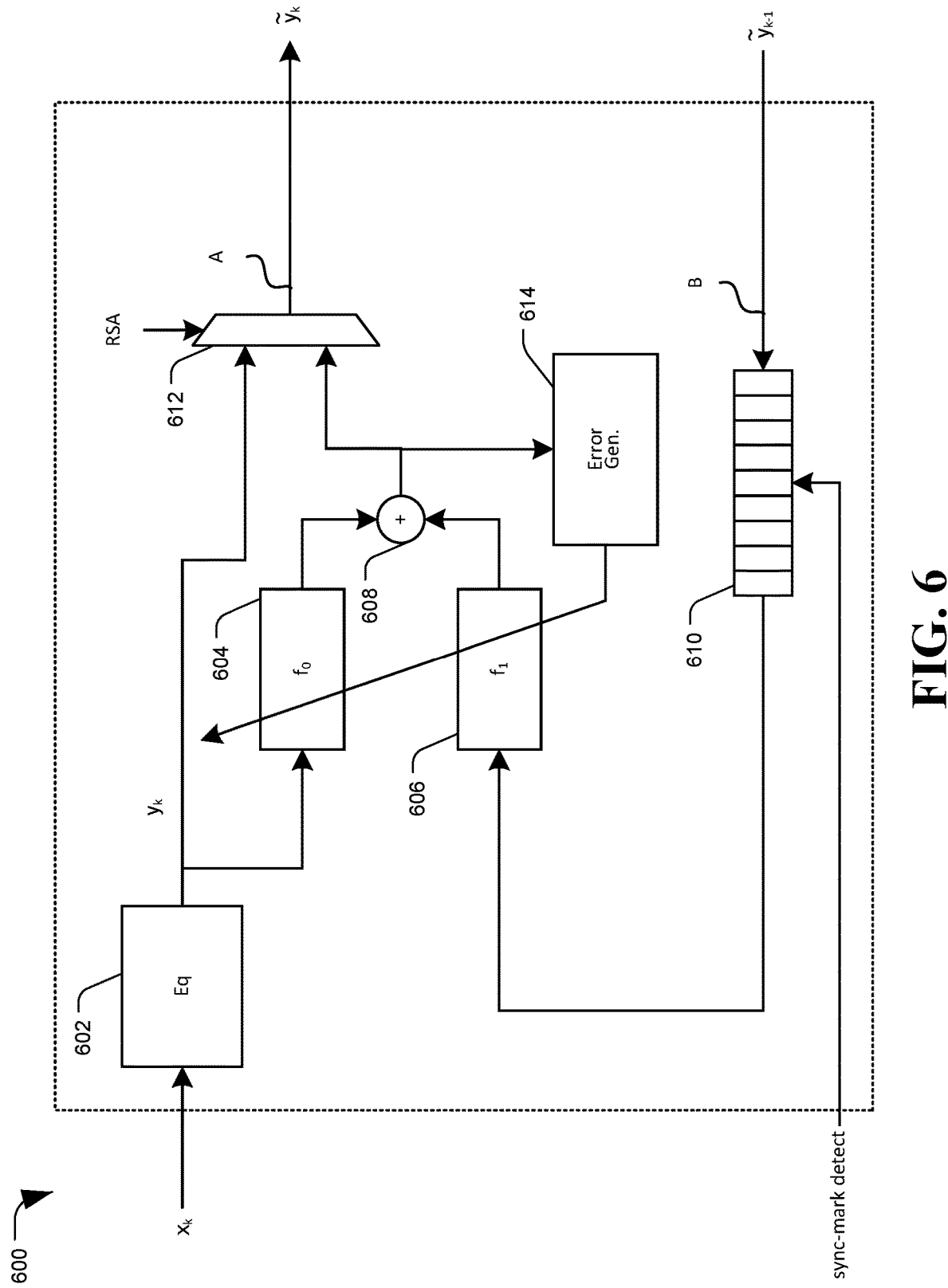
FIG. 6 is a diagram of a system configured to perform hardware-based read sample averaging, in accordance with certain embodiments of the present disclosure.

FIG. 6 is a diagram of a system configured to perform hardware-based read sample averaging, in accordance with certain embodiments of the present disclosure. In particular, FIG. 6 depicts an example read sample averaging module (RSAM) or digital front end (DFE) 600 of a read channel, which may correspond to the channel 300 of FIG. 3. The DFE 600 may include an equalizer (EQ) 602, a summation node 608, a delay line 610, and a multiplexer 612 as described in regard to FIG. 5.

Rather than the simple weighting nodes of FIG. 5, the DFE 600 may include a first filter ($f_0$) module 604 and a second filter ($f_1$) module 606, which may apply more complex signal filtering techniques to the sample sets than a simple multiplier value. As shown, the samples $y_k$ and $\tilde{y}_{k-1}$ may be applied to the first filter 604 and the second filter 606, respectively, and the outputs of the filters may be summed at the summation node 608. The output of the summation node 608 may be sent to both the memory (e.g. via the multiplexer 612 as DFE 600 output $\tilde{y}_k$) and to an error generation module 614. The error generation module 614 may use the averaged sample values from the summation node 608 for the purpose of adapting the first filter ($f_0$) 604 and the second filter ($f_1$) 606. For example, the error generation module 614 may subtract the averaged sample values from expected signal values to generate an error, and use the error to adapt the filter coefficients. An advantage to this architecture is that the filters may be adapted based on the samples provided to the error generation module 614, thus obviating the need for a weight selection strategy. The use of filters here (as opposed to weights) also allows for spectral weight of the inputs to the first filter module 604 and the second filter module 606. The read number k may be used in this context to appropriately select the starting filter weights for each re-read. For example, if 5-tap filters are used, in a manner similar to (2), these filters may be set to $$f_0 = \left[0, 0, \frac{1}{k+1}, 0, 0\right]$$

and $$f_1 = \left[0, 0, \frac{k}{k+1}, 0, 0\right]$$

as a starting point for the adaptation for re-read k. An example read channel configured for hardware-based read sample averaging, which may include DFEs such as the examples presented in FIGS. 5 and 6, is shown in FIG. 7

Figure 7:
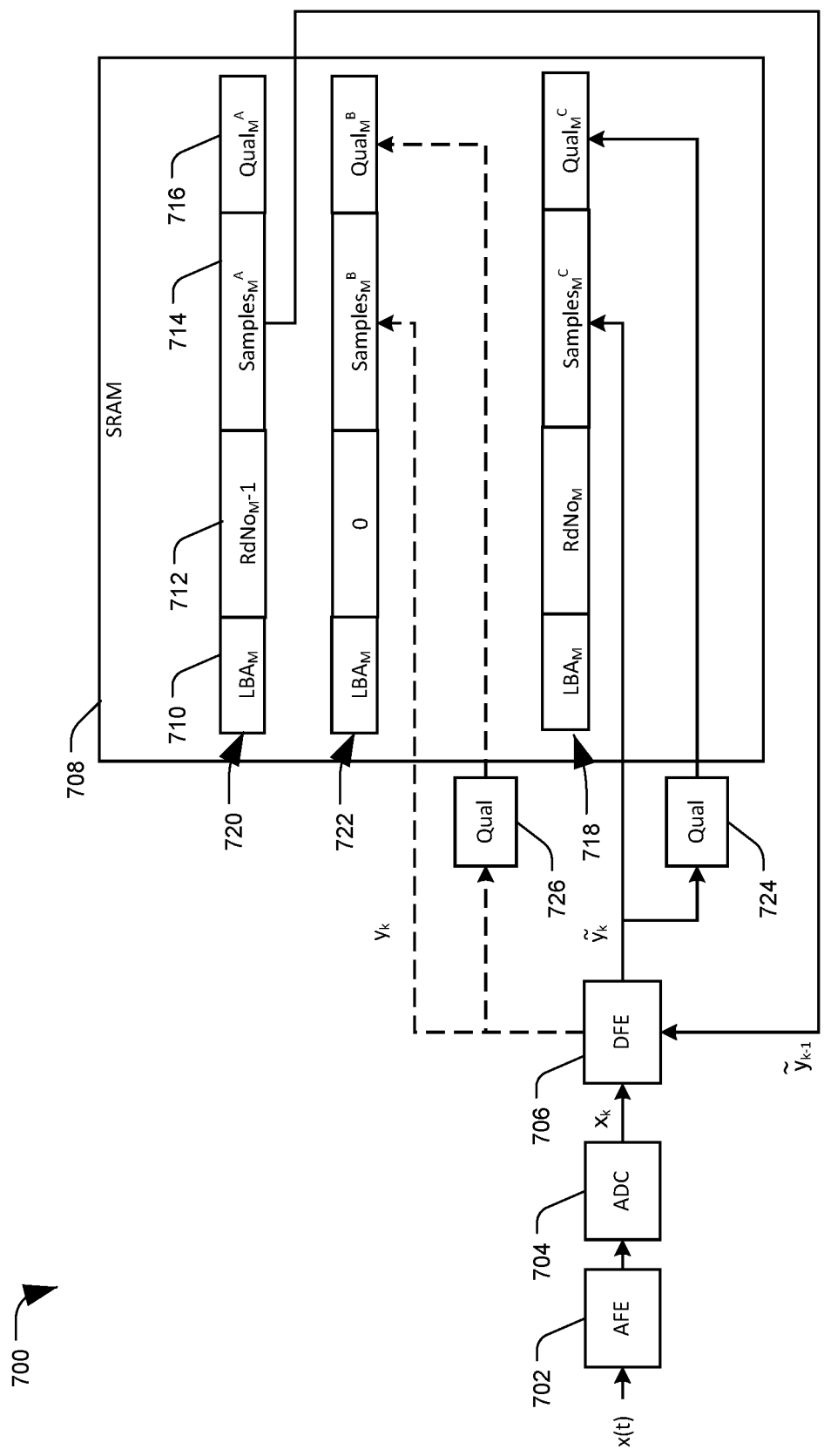
FIG. 7 is a diagram of a system configured to perform hardware-based read sample averaging, in accordance with certain embodiments of the present disclosure.

FIG. 7 is a diagram of a system configured to perform hardware-based read sample averaging, generally designated 700, in accordance with certain embodiments of the present disclosure. In particular, system 700 may include components of a read channel, such as channel 108 of FIG. 1. The system 700 may receive a signal x(t) (e.g. representing a signal x at time 't'), which may be processed by an analog front end (AFE) 702, an analog to digital converter (ADC) 704, and a digital front end (DFE) 706, and then the processed samples may be stored to an SRAM memory 708, as described elsewhere herein. The DFE 706 may comprise or include a read sample averaging module (RSAM) to perform the hardware-based read sample averaging operations. For each set of samples stored to the SRAM 708, the system 700 may maintain information identifying the associated logical block address (LBA) 710, a read number count 712, a set of samples 714, and a quality metric for the current read 716.

In the example system 700, logical block address M ($LBA_M$) may be undergoing a re-read number N ($RdNo_N$) and, thus, the previous set of samples A for $LBA_M$ ($Samples_M^A$) are being fed back to the DFE 706 for combination with the incoming samples ($x_k$). Focusing first on the path depicted in solid lines, as previously described, the combined samples $\tilde{y}_k$ may be written into SRAM 708. In this example embodiment, the combined samples $\tilde{y}_k$ may be written to an unused SRAM buffer 718 rather than overwriting the buffer 720 used to hold the samples $\tilde{y}_{k-1}$ being fed back.

Example system 700 may also include a first quality metric module (Qual) 724, which may generate, for each sector of samples, a figure-of-merit that may be indicative of the general quality of the read that was performed on the sector or of the generated samples. In some instances, this could be a mean-squared error of the associated samples, and in other instances it could be the number of unsatisfied check nodes that the decoding operation would start with (e.g. its syndrome weight). Any figure-of-merit could be utilized provided it gives a general indication of the relative difficulty of decoding the associated sector and, thus, may identify an approximate quality of the data obtained during the read operation. As shown, the system 700 may store this quality metric ($Qual_M^C$) along with the LBA, read number, and samples, to buffer entry 718 (although some of the information may be stored to registers or other memory associated with the current buffer entry 718 or the current read operation).

The dashed lines depict another optional path which may send the samples from the most recent read (e.g. the non-averaged sample values $y_k$) to an empty SRAM buffer 722, and may send the samples to a second quality metric module 726 to generate and store the computed quality of those samples ($Qual_M^B$). Since this is the result of a single read the RdNo 712 may be set to zero for this buffer 722. The end result may be that that two (in the case of using buffer entries 718 and 722) or one (in the case of using buffer entry 718 but not 722) additional SRAM buffers may be populated with samples of this sector M along with the previous read's combined samples (e.g. $Samples_M^A$ or $\tilde{y}_{k-1}$).

The quality metrics may be used in order to assuage the possibility of the most recent read being corrupted by an event as described above. In embodiments where the dashed path is utilized, the system 700 may compare $Qual_M^B$ (e.g. the quality metric associated with the non-averaged samples $y_k$) to a quality threshold that may be acceptable for a single sector read to determine whether to keep or utilize the new averaged sample values (e.g. $\tilde{y}_k$ or $Samples_M^C$). For example, if the $Qual_M^B$ value is too low, averaging the new read values into the prior read values may actually degrade the quality of the averaged sample data. In examples where the dashed path is not utilized, the system 700 may compare $Qual_M^A$ (for the previous sample set $\tilde{y}_{k-1}$) to $Qual_M^C$ (corresponding to the newly averaged sample set $\tilde{y}_k$) to determine whether the newest read has improved the quality of the samples relative to the previously read or averaged sample set. Other quality comparisons between the potential quality metrics can also be used to make evaluations on which data to use or retain. Using the result of the quality comparisons, the buffer entry storing the sample set that is deemed most likely to maximize the probability of subsequent successful decoding may be selected and locked, and the other buffer entry(ies) may be unlocked and overwritten. For example, a corrupted read may cause the previous read to be kept and, thus, $Samples_M^A$ may remain in the SRAM 708, while the newest read ($Samples_M^B$) and the newest combined read ($Samples_M^C$) may be flushed from memory. In another example, the new read may be of high enough quality to use in read sample averaging, and thus $Samples_M^C$ may be kept, while the entries for $Samples_M^A$ and $Samples_M^B$ may be flushed, as both may no longer be needed. In yet another example, the previous sample set $Samples_M^A$ may have a low quality metric $Qual_M^A$, while the newest read may have a high quality metric $Qual_M^B$. In this example, the newest read, $Samples_M^B$, may have a higher quality metric than either the previous read $Samples_M^A$ or the averaged read $Samples_M^C$, and thus only the newest read may be locked while the previous sample set and the newly averaged sample set may be flushed. In yet another example, the quality metric of the newest read $\text{Qual}_M^B$ may be compared against the quality metric of the averaged samples $\text{Qual}_M^C$, and the samples associated with the higher of these two may be kept, while the one with the lower quality metric and the previous sample data $\text{Samples}_M^A$ may be discarded. In yet another example, the quality metrics for all three entries may be compared, and the samples corresponding to the highest metric may be stored while the rest are discarded. Using these example comparison operations, the memory usage may only temporarily be increased by one or two buffer entries; however, the system 700 may quickly identify and flush unused buffer entries from SRAM 708 when they are determined to no longer be useful.

The architecture proposed in FIG. 7 is merely exemplary, and changes may be made without departing from the scope of this disclosure. For example, a single quality metric module may be used instead of the first quality metric module 724 and the second quality metric module 726. One or more quality metric modules may be incorporated into the DFE 706 or as part of the RSAM, rather than being separate elements. A quality metric module for the current read (e.g. based on samples $x_k$) may precede the DFE 706. Other embodiments are also possible. Examples methods of hardware-based read sample averaging are discussed in regard to the following flowcharts.

Figure 8:
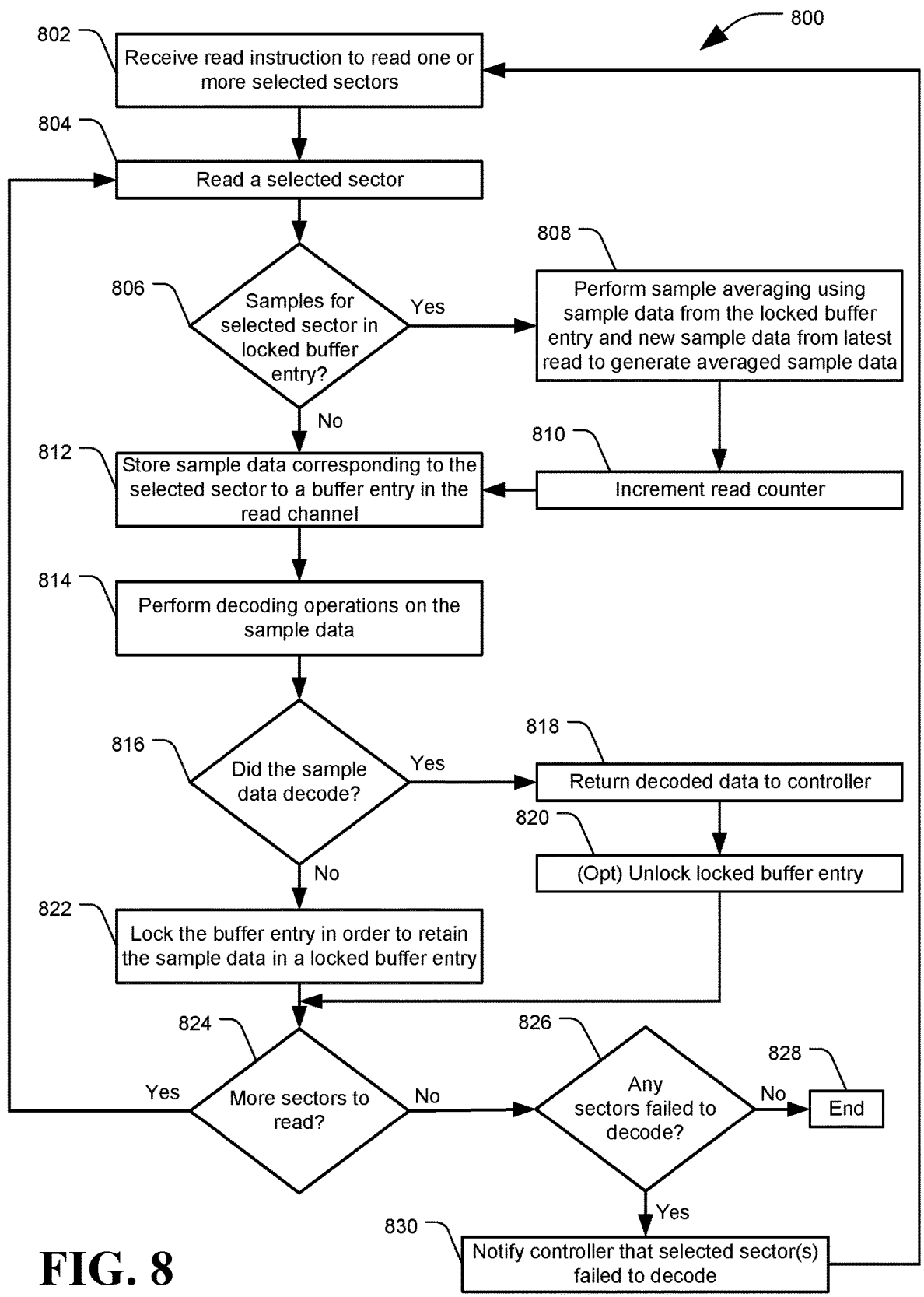
FIG. 8 is a flowchart of an example method of hardware-based read sample averaging, in accordance with certain embodiments of the present disclosure.

FIG. 8 is a flowchart of an example method of hardware-based read sample averaging, generally designated 800, in accordance with certain embodiments of the present disclosure. Method 800 may be performed by one or more components of a read channel of data storage device (DSD), such as by read sample averaging module (RSAM) 112 of FIG. 1 or digital front end (DFE) 406 of FIG. 4.

The method 800 may include receiving, at a read channel from a controller of a DSD, a read instruction to read one or more selected sectors from a memory of the DSD, at 802. In response to receiving the instruction, the method 800 may include reading a selected sector included in the read instruction, at 804. For example, reading the selected sector may include detecting a signal pattern from the sector via a read head, and determining a sample sequence from the signal pattern via an analog to digital converter (ADC).

A determination may be made as to whether samples for the selected sector are locked in a buffer entry of the channel, at 806. For example, LBAs may be stored to the buffer entries, to a separate register(s), or otherwise accessible to the channel, which LBAs may be compared against the LBA for the selected sector to identify whether samples for the selected sector are already stored in a locked buffer entry. If samples for the selected sector are locked in a buffer entry, the method 800 may include performing sample averaging, using sample data from the locked buffer entry and new sample data from the latest read of the sector, to generate averaged sample data, at 808. The method may also include incrementing a read counter value for the selected sector, at 810. For example the DSD may store a read counter for sectors in order to determine how many times a sector has been re-read and as a potential value in read sample averaging calculations.

After performing the sample averaging, at 808, or if there are no prior samples for the selected sector locked in a buffer entry, at 806, the method 800 may include storing sample data corresponding to the selected sector to a buffer entry in the read channel, at 812. For example, the sample data to be stored may be read sample averaged data, from 808, or a first read result on a new read from 806.

The method 800 may include performing decoding operations on the sample data for the selected sector, at 814, such as by passing the stored sample data from an SRAM buffer to a decoder module of the channel. A determination may be made whether the sample data successfully decoded, at 816. If it did, the successfully decoded data for the selected sector may be returned to the controller 818, which may, e.g. return to the data to a host device which initiated the read operation. The buffer entry in which the sample data for the selected sector may be unlocked, at 820, if the buffer entry had previously been locked (e.g. the data decoded after at least one re-read operation). If the sample data failed to decode, at 816, the method 800 may include locking the buffer entry for the selected sector in order to retain the sample data in a locked buffer entry in anticipation of re-read operations, at 822.

After locking the buffer entry when the selected sector failed to decode, or after returning data when the sector did fail to decode, the method 800 may include determining whether there are more sectors to read from the initial read instruction, at 824. If there are, the method 800 may include reading a next selected sector from the read instruction, at 804. If there are no more sectors to read, the method 800 may include determining whether any sectors from the read instruction failed to decode, at 826. If not, then all sectors from the read instruction may have decoded successfully and the method may end, at 828. However, if any sectors did fail to decode, the method 800 may include notifying the controller that specific selected sector(s) failed to decode, at 830. In response, the controller may then issue a re-read instruction, at 802, directed to one or more of the selected sectors that failed to decode, which may result in the channel performing hardware-based read sample averaging for the failed sectors, which may each have sample sets in locked buffer entries of the channel memory. In some embodiments, successfully read data may all be returned to the controller once the read operation completes, or indications that a sector failed to decode may be sent to the controller as the failure occurs instead of at the end of the operation. Other modifications may be made to the example method 800 without departing from the scope of the disclosure. Another example method of hardware-based read sample averaging is shown in FIG. 9.

Figure 9:
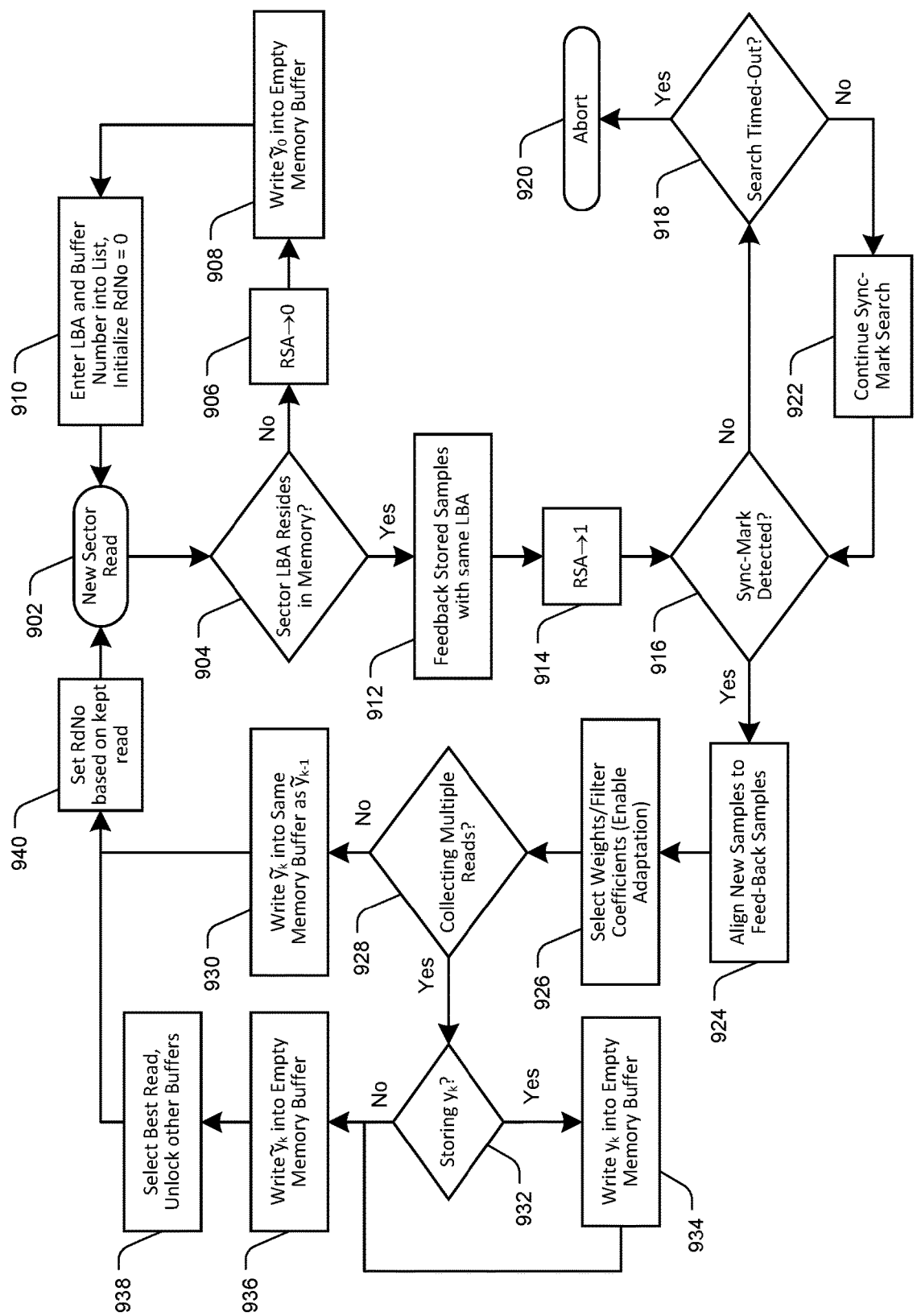
FIG. 9 is a flowchart of an example method of hardware-based read sample averaging, in accordance with certain embodiments of the present disclosure.

FIG. 9 is a flowchart of an example method of hardware-based read sample averaging, generally designated 900, in accordance with certain embodiments of the present disclosure. Method 900 may be performed by one or more components of a read channel of data storage device (DSD), such as by read sample averaging module (RSAM) 112 of FIG. 1 or digital front end (DFE) 406 of FIG. 4. A channel operating according to method 900 may achieve read sample averaging with almost no requirement for firmware (e.g. controller) intervention.

Method 900 may include performing a new sector read, at 902. A determination may be made whether samples for the sector's LBA already resides in memory, such as in a locked buffer entry of an SRAM buffer, at 904. The determination of whether the samples are in memory may optionally be performed prior to executing the read operation on the physical sector corresponding to the LBA, for example while a read head is approaching the expected location of the sector, in order to prepare for potential read sample averaging operation.

If the sector's LBA is not already in memory, a control bit or signal which may control read sample averaging (RSA) may be set to 0, at 906, so that read sample averaging operations are not performed. For example, the RSA value may be provided to a multiplexer, with an RSA value of 0 resulting in the multiplexer sending on the sample values from the most recent read, while an RSA value of 1 may result in the multiplexer sending along the output of a read sample averaging operation which averages the most recent read and previously stored samples. At 908, the non-averaged samples $\tilde{y}_k$ may be stored to an empty buffer entry, at 908. The method 900 may include entering the LBA for the sector, and a quality metric for the sample values, into a list, and initializing a read number value for the sector (RdNo) to 0, at 910. The list may be stored to a separate memory, although in some embodiments some or all of the identified information may be stored to the buffer along with the samples. If the list is stored separate from the buffer entries including the sample values, the method 900 may also include storing a buffer number along with each LBA and RdNo, identifying which buffer entry the corresponding samples for the sector are stored to. The method 900 may then proceed to read a new sector at 902.

If the sector LBA does already reside in the memory, at 904, the method 900 may include feeding back the stored samples from the same LBA to a digital front end (DFE), a read sample averaging module (RSAM), or another component that can perform read sample averaging. The RSA value may be set to 1, at 914 and asserted to select the linear combination of the incoming and fed-back samples. A determination may then be made whether a sync-mark has been detected for the sector, at 916. The sync-mark may be a signal pattern recorded to the storage medium prior to a user data field of the sector, and may be used to identify a start point of the data signal to be sampled. If the sync-mark is not detected, a determination may be made as to whether a search for the sync-mark has timed out, at 918. If so, the read head may be misaligned, the sector may be damaged, or some other fault may have occurred, and the read may be aborted, at 920. If the search has not timed out, the method 900 may include continuing the sync-mark search, at 922.

When the sync-mark is detected, at 916, the method 900 may include beginning the read and aligning the newly read samples to the feed-back samples from the buffer, at 924. The feed-back samples may be passed through a delay line configured to hold the samples until the sync-mark is detected, so that each newly read sample period aligns in time with the corresponding sample from the feed-back data.

The method 900 may include selecting weights to apply to the new samples and the feedback samples, or selecting filter coefficients and enabling automatic filter adaptation based on the output of the read sample averaging operation, at 926. In some embodiments the relative weighting of the samples may be fixed (e.g. using equation (3)); in other embodiments the relative weighting may be selected based on read number (e.g. using equation (2)); and in other embodiments the weighting may be selected through an adaptation procedure, where the weighting can even be selected as a filtering operation (e.g. as shown in FIG. 6).

According to some embodiments (e.g. an embodiment as described in regard to FIG. 7), a determination may be made whether to collect or store multiple reads or sample sets simultaneously (e.g. storing multiple sample sets based on a single re-read of a selected sector), at 928. If not, or if no determination is made at 928, the result of the linear combination of samples may, then, either be written into the same buffer that held the fed-back samples (at 930), or written to a free buffer, after which the original buffer may be unlocked. The read number (RdNo) for the LBA may be updated at 940, and a next sector read performed at 902.

In embodiments where a determination to collect multiple reads is made at 928, a determination may be made whether to store the samples of the newest read itself, $y_k$, or only to store the newest combined samples $\tilde{y}_k$, at 932. If $y_k$ is to be stored, the $y_k$ samples may be written to an empty buffer memory at 934. The method 900 may also include writing the newest combined sample $\tilde{y}_k$ into another empty memory buffer, at 936. Accordingly, the memory may have on buffer entry storing $\tilde{y}_{k-1}$, and may have one buffer entry each for $y_k$ and $\tilde{y}k$ when both are to be kept, or one more entry for $\tilde{y}k$ when $y_k$ is not be kept.

A quality metric associated with the newest combined samples $\tilde{y}_k$ (and, possibly, the newest read itself $y_k$) may be generated to be compared with the quality metric of the fed-back samples $\tilde{y}_{k-1}$, such that the best sample set or read may be selected and the other sample sets unlocked and flushed, at 938. The RdNo may be updated based on the kept read, at 940. For example, if the newly combined samples $\tilde{y}_k$ are kept, the RdNo may be incremented by one. If only the previous sample set $\tilde{y}_{k-1}$ is kept, the RdNo may remain unchanged because no additional read has been factored in. If only the current read $y_k$ is kept, the RdNo may be reset to 0. The decoding operation may ensue using the updated or newest samples. Additional reads may be performed at 902.

According to the methodology proposed in this disclosure, the number of sectors that may be simultaneously recovered using hardware-based read sample averaging may only be limited by the total number of available buffers. Furthermore, firmware intervention may be limited to the issuing of the initial reads and re-read commands for failed sectors, as hardware can keep track of all sectors residing in memory, act to select the correct sample path on re-reads, and program the weights or filters used for sample combining. As such, multiple sector recovery may be made almost transparent to the firmware and can easily be run in parallel with normal read commands. In addition, since the memory may be constantly updated by the newest samples generated, those samples can subsequently be used for additional retry operations in the event that read sample averaging alone is insufficient to recover the data. In the event that the firmware decides to cease attempts to recover a failed sector, it may issue a "flush" command to the channel to unlock and clear a buffer entry for the failed sector.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a read channel circuit configured to perform hardware-based read sample averaging, the read channel circuit including:
   an analog-to-digital converter (ADC) configured to sample an analog signal to produce a set of read sample values for a selected sector;
   a buffer memory configured to store a plurality of sample value sets corresponding to a plurality of sectors;
   a read sample averaging circuit configured to receive the set of read sample values from the ADC and provide a selected set of sample values to the buffer memory, the read sample averaging circuit including:
      a first multiplexer configured to select the selected set of sample values from:
         1) an averaged sample set, generated based on the set of read sample values and a previous sample set corresponding to the selected sector, when the previous sample set is already stored to the buffer memory;
         2) the set of read sample values, when the previous sample set is not stored to the buffer memory; and
      a delay line configured to delay delivery of the previous sample set based on detection of a beginning of the selected sector, to align the previous sample set with the set of read sample values to generate the averaged sample set.

2. The apparatus of claim 1, further comprising:
the read sample averaging circuit further including:
   a first weighting node configured to apply a first weighting factor to the set of read sample values;
   a second weighting node configured to apply a second weighting factor to the previous sample set received from the buffer memory; and
   a summation node configured to combine outputs from the first weighting node and the second weighting node to generate the averaged sample set.

3. The apparatus of claim 2, further comprising:
the first weighting factor and the second weighting factor are fixed multiplier values applied to a respective sample set, where a total multiplier of the first weighting factor and the second weighting factor is equal to 1.

4. The apparatus of claim 2, further comprising:
the first weighting factor and the second weighting factor are dynamic multiplier values applied to a respective sample set, where a total multiplier of the first weighting factor and the second weighting factor is equal to 1; and
the read sample averaging circuit configured to adjust the multiplier values based on a number of re-read attempts performed for the selected sector.

5. The apparatus of claim 2, further comprising:
the first weighting node and the second weighting node include a first multi-tap filter and a second multi-tap filter respectively, the first multi-tap filter and the second multi-tap filter configured for dynamic adaptation of the first weighting factor and the second weighting factor; and
the read sample averaging circuit further including an error generation module configured to dynamically adapt the first weighting factor and the second weighting factor based on an output from the summation node and a number of re-read attempts performed for the selected sector.

6. The apparatus of claim 2, further comprising:
the delay line including a circular buffer configured to delay delivery of the previous sample set to the second weighting node based on detection of a sync mark at the beginning of the selected sector during a current read that results in the set of read sample values.

7. The apparatus of claim 1, the read channel circuit further comprising:
a decoder configured to:
   receive the selected set of sample values from the buffer memory;
   perform a decoding operation to determine a bit sequence from the selected set of sample values;
   output a decoded bit sequence when the selected set of sample values decodes; and
   direct the buffer memory to retain the selected set of sample values in a locked buffer entry when then selected set of sample values fails to decode, the locked buffer entry corresponding to the previous sample set on a subsequent attempt to read the selected sector.

8. The apparatus of claim 7, the read channel circuit further comprising:
a second multiplexer configured to direct the set of read sample values from the read sample averaging circuit into a selected entry of the buffer memory;
a third multiplexer configured to direct the selected set of sample values from the buffer memory to the decoder; and
a fourth multiplexer configured to direct the previous sample set corresponding to the selected sector from the buffer memory to the read sample averaging circuit.

9. The apparatus of claim 1, the read channel circuit further comprising:
a quality metric circuit configured to:
   generate a first quality metric for a given set of sample values, the first quality metric indicating a relative difficulty of decoding the given set of sample values;
   store the first quality metric to a memory internal to the read channel circuit;
the read sample averaging circuit configured to:
   compare the first quality metric to another value; and
   determine how to utilize the given set of sample values in read sample averaging based on the comparison.

10. An apparatus comprising:
a read channel circuit configured to perform hardware-based read sample averaging, the read channel circuit including:
   a buffer memory configured to store a plurality of sample value sets corresponding to a plurality of sectors;
   a quality metric circuit configured to generate, for a given set of sample values, a first quality metric indicating a relative difficulty of decoding the given set of sample values;
   a read sample averaging circuit configured to:
      receive a set of read sample values for a selected sector;
      provide a selected set of sample values to the buffer memory, the read sample averaging circuit including:
         a first multiplexer configured to select the selected set of sample values from:

1) an averaged sample set, generated based on the set of read sample values and a previous sample set corresponding to the selected sector, when the previous sample set is already stored to the buffer memory;

2) the set of read sample values, when the previous sample set is not stored to the buffer memory; and when two sets of sample values for the selected sector are stored to the buffer memory, determine which of the two sets of sample values to discard based on respective quality metrics for the two sets of sample values.

11. The apparatus of claim 10, the read channel circuit further comprising:
the quality metric circuit configured to store the first quality metric to a memory internal to the read channel circuit;
the read sample averaging circuit configured to:
compare the first quality metric to another value; and
determine how to utilize the given set of sample values in read sample averaging based on the comparison.

12. The apparatus of claim 11, further comprising:
the given set of samples is the set of read sample values;
the another value is a quality threshold value; and
the read sample averaging circuit further configured to not use the set of read sample values in read sample averaging operations when the first quality metric is below the quality threshold value.

13. The apparatus of claim 11, further comprising:
the given set of samples is the selected set of samples output from the read sample averaging circuit;
the another value is a second quality metric corresponding to the previous sample set;
the read sample averaging circuit further configured to:
select which set of samples to retain in the buffer memory, including:
retain the selected sample set and discard the previous sample set when the first quality metric is higher than the second quality metric; and
retain the previous sample set and discard the selected sample set when the second quality metric is higher than the first quality metric.

14. The apparatus of claim 13, further comprising:
the read channel circuit further comprising an analog-to-digital converter (ADC) configured to sample an analog signal to produce the set of read sample values for the selected sector;
the read sample averaging circuit further configured to:
compare values for:
1) the first quality metric, corresponding to the selected set of samples output from the read sample averaging circuit;
2) the second quality metric, corresponding to the previous sample set; and
3) a third quality metric, corresponding to the set of read sample values from the ADC;
retain a sample set corresponding a highest quality metric; and
discard sample sets not corresponding to the highest quality metric.

15. The apparatus of claim 14, comprising the read sample averaging circuit further configured to:
maintain a read count value corresponding to a number of re-read attempts that have been averaged together for the selected sector;
update the read count value based on the sample set corresponding to the highest quality metric, including:
increment the read count value when the first quality metric is the highest quality metric;
retain the read count value at a current value when the second quality metric is the highest quality metric; and
reset the read count value to 0 when the third quality metric is the highest quality metric.

16. The apparatus of claim 10, the read channel circuit further comprising:
a decoder configured to:
receive the selected set of sample values from the buffer memory;
perform a decoding operation to determine a bit sequence from the selected set of sample values;
output a decoded bit sequence when the selected set of sample values decodes; and
direct the buffer memory to retain the selected set of sample values in a locked buffer entry when the selected set of sample values fails to decode, the locked buffer entry corresponding to the previous sample set on a subsequent attempt to read the selected sector.

17. An apparatus comprising:
a read channel circuit configured to perform simultaneous multi-sector hardware-based read sample averaging, including:
a read sample averaging circuit configured to:
receive a plurality of sample sets corresponding to a plurality of sectors read during a read operation;
determine, for each sector within the read operation, whether to perform read sample averaging based on whether prior data for a read sector is already stored to a buffer memory, including:
1) store an averaged sample set to the buffer memory as a selected set of sample values when the prior data is already stored to the buffer memory, the averaged sample set calculated from a sample set received from the read operation and the prior data from the buffer memory;
2) store the sample set received from the read operation to the buffer memory as the selected set of sample values when the prior data is not stored to the buffer memory; and
a decoder configured to determine a bit sequence based on the selected set of sample values.

18. The apparatus of claim 17, further comprising:
the decoder further configured to:
receive the selected set of sample values from the buffer memory;
perform a decoding operation to determine the bit sequence;
output a decoded bit sequence when the selected set of sample values decodes; and
direct the buffer memory to retain the selected set of sample values in a locked buffer entry when then selected set of sample values fails to decode, the locked buffer entry corresponding to the prior data on a subsequent attempt to read the selected sector.

19. The apparatus of claim 17, further comprising:
the read sample averaging circuit further including a delay line configured to align delivery of the prior data from the buffer memory with the sample set received from the read operation to perform read sample averaging.

20. The apparatus of claim 19, further comprising:
the delay line including a circular buffer configured to delay delivery of the prior data based on detection of a sync mark at a beginning of a selected sector during the read operation that results in the sample set received from the read operation;
the read channel circuit further including an analog-to-digital converter (ADC) configured to:
sample an analog signal to produce the sample set received from the read operation sample values for the selected sector; and
provide the sample set received from the read operation to the read sample averaging circuit.

\* \* \* \* \*